United States Patent Office 3,266,908
Patented August 16, 1966

3,266,908
PROCESS OF PREPARING MEAT SAUCES AND GRAVIES
Alfred E. Allen, Jr., Bothell, Wash., assignor to Western Farmers Association, Seattle, Wash.
No Drawing. Filed Oct. 2, 1963, Ser. No. 313,158
11 Claims. (Cl. 99—144)

The present invention relates in general to poultry sauces and gravies and more especially to a concentrated sauce or gravy composition and a novel process for making the same. In its broadest sense the process of the present invention is adaptable to the preparation of sauces and gravies from cooked meat products which include fish, fowl and animal materials, utilizing the natural fats and flavor of the meat, whereby the resulting food product has maximum storage life and flavor retention qualities.

More particularly, the present invention contemplates a concentrated poultry meat composition suitable for consumption in sauces, gravies, soups, etc. prepared from a susbtantial percentage of freshly cooked poultry meat products. According to the present invention, poultry food concentrates are made from freshly cooked chicken and turkeys, for example, by means of the novel process of the present invention which are suitable for preservation in dry powder form without refrigeration and loss of flavor, as a frozen semi-liquid or slurry or as canned gravies.

Although many concentrated poultry food products, in various forms, are available in the prior art, such products are composed of base stock or meat extracts with starches or other thickening agents forming the main body of the composition and with reliance upon added meat fat or artificial substances to provide the desired flavor. It has now been discovered that prepared poultry concentrates containing a high percentage of whole cooked poultry meat and skin may be prepared according to the present process with maximum storage life either in dehydrated powder form, frozen, or canned form and suitable for consumption as sauces, gravies, or the like by simply adding the desired amount of water or milk prior to consumption. According to the present invention, the predominate constituent or main body of the gravy is composed of actual meat substance.

A primary object of the present invention, therefore, is to provide a concentrated poultry food composition suitable for gravies and sauces and containing substantially large amounts of cooked poultry meat, skin and natural fat.

A further object of the present invention is the provision of a sauce or gravy concentrate of the character described having maximum storage life and flavor retention qualities.

A further object of the present invention is to provide a poultry food composition suitable for gravies, sauces and the like having an even, smooth consistency and capable of quick preparation with the addition of suitable amounts of water, milk or other liquids.

A further object of the present invention is to present a novel process for the preparation of meat gravies and sauces utilizing substantial amounts of whole meat products.

A still further object of the present invention is to present a novel process for making poultry gravy and sauce concentrates of the type described suitable for storage in dehydrated powder form.

A still further object of the present invention is to present a novel method for the preparation of poultry gravies and sauces of the type described suitable for storage as frozen food or canned in a semi-liquid or slurry form.

These and other objects of the invention will be apparent from the following description and claims.

In the following description of the present invention, reference is made to specific examples of chicken and turkey meats by way of example but it will be understood that any poultry meat is suitable for preparation into the described food composition and is equally well adapted to the described process.

The process for the preparation of the present food products begins with the cooking of whole chickens, turkeys or other poultry in any well known manner such as is presently done in the canning of whole chickens or turkeys. In the normal process, the bones and skin are removed from the poultry and are sometimes treated as by-products with only the poultry meat being utilized for human consumption.

It is also well known that most of the fat substance in poultry is closely connected to the skin and is therefore disposed of with the removal of the skin. In connection with the present food product, the cleaned and cooked poultry skin and fat, as well as the lean meat, is utilized and therefore, in a broad sense, the present process may be said to utilize both the primary products and by-products from the cooking process. According to U.S.D.A. requirements, poultry meat products for sale to the general public must contain a minimum of 2% by weight of dry solids composition of meat material. Accordingly, the present invention seeks to utilize the maximum food material from the cooked poultry by utilizing a combination of cooked skin and cooked lean meat from the poultry. It is, course, possible to utilize lean meat products exclusively. However, such would be occasioned with a loss of the natural flavor desired.

In continuing with the steps in the present process, a primary homogenized slurry is formed from a combination of cooked chicken or turkey skin and natural fat, cooked turkey or chicken meat, and cold water which is then utilized in further steps in the process, later to be described. The preliminary homogenized slurry will hereinafter be referred to as #1 slurry with the formula for such slurry being designated as #1 slurry formula. The following example of a typical slurry batch has been utilized:

1 SLURRY (CHICKEN OR TURKEY)

*1 Batch*

Cooked chicken skin (20–20% fat) or turkey skin (25–35% fat) _____ 528 lbs.
Cooked chicken meat or turkey meat _____ 20 lbs. 7 oz.
Cold water _____ 528 lbs.

It has been found, insofar as the proportionate composition of the #1 slurry is concerned, that it is immaterial as to the type of meat and poultry skin utilized and hence the #1 slurry batch formula above has been designated as either chicken or turkey. The description of the preparation of the #1 slurry will therefore be made in terms of poultry meat and skin broadly, with the understanding that either chicken or turkey products are referred to.

The cooked poultry skin and meat with the natural fat content, in proportions according to the above #1 slurry formula, are first ground to a rather fine consistency. It has been found in practice that it is preferable to grind the meat and the skin separately and to later combine the ground products with the addition of the cold water. The poultry skin and meat can be passed through a conventional grinding machine using a $\frac{3}{64}$ inch hole plate. With this procedure, it has been found necessary to grind the materials only once.

After the poultry skin and meat have been separately ground, the same is passed separately through a Micro Cut Emulsifier using a #2 setting. The Micro Cut Emulsifier is a processing unit commercially available and well-known to those skilled in the food processing arts. The emulsifying step is self explanatory and needs no further description to those skilled in the art and the #2 setting referred to is a standard arbitrary setting well-known to those familiar with such devices.

After the poultry skin and meat have been separately ground and emulsified, they are mixed together with the quantity of cold water designated in the #1 slurry formula and it will be noted that the quantity of water used is equal in weight to the amount of poultry skin and fat in the typical slurry batch example. Some latitude is permissible, however, and the amount of water added to form the #1 slurry can be characterized as being approximately equal to the amount of the meat substance which includes natural fats, skin and lean meat fibers. At the time of mixing the skin and meat together with the water, the water should be extremely cold but, of course, above freezing. The later to be described low temperature of the water facilitates the homogenizing step. The exact temperature of the cold water is not critical and it is necessary only to have the water at a temperature which would commonly be referred to as "ice cold water." Since an extremely wide range of water temperature would accomplish the present purpose, no specific range is designated. After the skin and meat have been mixed with the ice cold water, the resulting mass is ready for delivery to a suitable homogenizer which may be any conventional homogenizer known to the art.

The mixture, as described, is pumped to the homogenizer with a feed pump pressure preferably between 40 and 60 pounds. According to the present invention, the homogenizer is operated under pressure at approximately 6,000 to 7,000 p.s.i. with a permissible range of 5,000 to 8,000 p.s.i. It is essential, in the preparation of the slurries later to be spray dried, that the pressure in the homogenizer be maintained at substantially the pressure range designated and the homogenizer should, in no instance, be allowed to drop below 5,000 p.s.i. In the event that the homogenizer pressure does drop below 5,000 p.s.i., it is necessary to return the material through the homogenizer again at the proper p.s.i. reading. If the gravy slurry is to be preserved in any form other than that involving the spray drying steps to be described, the homogenizing pressure is not absolutely critical. It is preferred, however, that pressure be maintained during homogenization in all cases and that the pressure be held at a minimum of approximately 3,000 p.s.i. After the homogenization of the mixture, the resulting slurry is kept under refrigeration until further processing. At this point, the preparation of the #1 slurry is completed and the slurry is ready to be further processed with certain additives to be described.

In the nature of quality control and in the interest of obtaining the highest quality product possible, chicken or turkey skin, fat and meat utilized for processing according to the present invention should be of good quality fresh or frozen products and should not exceed a peroxide value of "7" (milliequivalent per 1,000 gr. sample). It is also essential that the #1 slurry described should not be held over 30 hours and that the slurry be held under refrigeration with a temperature of 34–36° F.

With the homogenized slurry as a starting product prepared and ready for use according to the procedure described in the #1 slurry formula set out above, the preparation of the gravy or sauce composition is continued by formulating and properly processing a final slurry which will be hereinafter referred to as #2 slurry. It has been found that different poultry products require slightly different slurry preparation for the final or #2 slurry and hence examples will be given with chicken product slurries and turkey product slurries. The following two slurry formulae have been utilized in the preparation of slurry batches as indicated:

2 SLURRY FORMULA (CHICKEN)

*1 Batch*

| | |
|---|---|
| Chicken skin, meat and water (#1 slurry batch homogenized) | 1,076 lbs. 7 oz. |
| Rice flour | 336 lbs. |
| Salt | 60 lbs. |
| Saligen (monosodium glutamate) | 54 lbs. |
| Starch phosphate | 39 lbs. |
| U.S. certified egg yolk color (dark) | 138 grams. |
| Antioxidant (Tenox #4) | 28.8 cc. (approx. 28.8 grams.) |
| Water | 1,483 lbs. |

2 SLURRY FORMULA (TURKEY)

| | |
|---|---|
| Turkey skin, meat and water (#1 slurry batch homogenized) | 1,076 lbs. 7 oz. |
| Rice flour | 336 lbs. |
| Salt | 61 lbs. |
| Saligen (monosodium glutamate) | 54 lbs. |
| Starch phosphate | 39 lbs. |
| Caramel color | 13 lbs. |
| Poultry seasoning (Lynden's Special by Crescent | 4.5 lbs. |
| U.S. certified egg yolk color (dark) | 176 grams. |
| Antioxidant (Tenox #4) | 28.8 cc. (approx. 28.8 grams.) |
| Water | 1,483 lbs. |

In preparing the #2 slurry formula, the entire batch of homogenized skin, fat and meat obtained from the preparation of the #1 slurry, whether it be chicken, turkey or other poultry is utilized in the batch formula for the #2 slurry. The #1 slurry formula batch is transferred to a large tank containing any suitable mixer apparatus commonly known in the art. After the mixer has begun its action, water in the proportion indicated above in the #2 slurry formula is run into the mixer. The water added at this point, is preferably cold water but need not be as cold as the water added during the preparation of the #1 slurry.

While the water is being added to the slurry and with the mixer operating, the balance of the ingredients set out in slurry Formula #2 is added to the mixture. It will be noted that the various ingredients added to the #1 slurry and additional water are in dry form so as to bring the #2 slurry batch to the range of 18–35% solids by weight. While there is no specific order for adding the balance of the dry ingredients, it has been found preferable to add the rice flour at a very even rate in order to obtain good mixing. The rice flour serves as a thickening agent which gives body to the finished gravy and also provides additional food value. It has also been experienced that the starch phosphate, which acts as a gelatinizer, must be added very slowly and evenly in order to avoid lumping the mixture. Starch phosphate has been found to be preferable because it gives no off-flavor and will not break down under high temperatures. It has been found that the same proportionate weight of rice flour and starch phosphate may be used in both the #2 slurry formula for chicken skin and meat and that for turkey skin and meat, as noted in the above formulae.

In adding the salt to the #2 slurry of chicken gravy, it has been found that 60 pounds per batch is sufficient while slightly more salt is required in the preparation of turkey gravy which requires 61 pounds of salt.

Commercially available monosodium glutamate, known as Saligen, is added to the batch formula in the same proportion of 54 pounds per batch in both the chicken slurry and the turkey slurry and serves as a flavor enhancer, as will be appreciated by those skilled in the art.

U.S. certified egg yolk color is added to the mixture as indicated in the formulae with 138 grams being utilized per batch of chicken slurry and a slightly larger amount, 176 grams, being utilized in the turkey slurry.

For the purpose of preventing rancidity during storage, an antioxidant is added to the batch in the same proportions in both the chicken and turkey slurries with 28.8 cc. being utilized in each formula. The preferred antioxidant utilized in the present invention is commercially available Tenox #4, which has been found to be an excellent rancidity preventing composition. The following table indicates the percentage dry weight composition of Tenox #4.

| | Percent by weight |
|---|---|
| Butylated hydroxyamisole | 20.0 |
| Butylated hydroxytoluene | 20.0 |
| Corn oil | 60.0 |

In the alternative, other suitable antioxidants such as soya flour, guaiac, Avenex (oat flour), rice bran concentrate, tocopherols and ascorbic acid may be utilized in the proper quantities in the present invention.

In preparing the #2 slurry formula for turkey gravy, it has been found desirable to add additional color and seasoning to the batch in the proportion indicated in the above formula. Caramel color is utilized with 13 lbs. being added to each batch formula. Additional seasoning may be added to the turkey slurry and is commercially available as poultry seasoning with 4.5 pounds being added to each batch of turkey slurry. Lynden's Special by Crescent has been found to give excellent results and contains the following dry weight composition:

| | Percent by weight |
|---|---|
| Decorticated black pepper | 20.000 |
| Butter salt | 16.25 |
| Ground sage | 12.50 |
| Ground celery | 12.50 |
| Ground marjoram | 12.50 |
| Ground thyme | 10.00 |
| Onion powder | 10.00 |
| Monosodium glutamate | 6.25 |

In preparation of chicken gravy, it has been found unnecessary to add additional color, other than the egg yolk color mentioned, or seasoning as is the case with the turkey slurry.

The ingredients of the #2 slurry is allowed to remain in the mixer until the entire batch is thoroughly mixed in an even smooth consistency. At this point, the gravy or sauce product in the form of slurry is ready for further processing to condition the material for storage. The present food product is capable of being stored either in dehydrated powder form, in frozen form or as a canned gravy of the desired consistency.

In preparing the dehydrated powder form of gravy concentrate, the chicken, turkey or other poultry slurry obtained from the #2 slurry formula and prepared as described is pumped to a heat exchanger where the material is preheated to approximately 125° F. and in no case exceeding 130° F. The preheated material is then transferred to a main pump for supplying the slurry to a nozzle dryer. It has been found that drying proceeds most satisfactorily with a main pump pressure at 5,000 p.s.i. and utilizing a .040" size nozzle. The in-temperature at the dryer should be approximately 295° F. to 300° F. and lowering to an out-temperature of from 190° to 200° F.

The dried gravy product is screened as it comes out of the dryer and is ready for suitable canning or packaging. With the described procedure, the finished gravy powder is slightly granular and is light golden in color and will produce a smooth medium thick gravy without lumps when reconstituted in water and brought to the boiling point.

It has been found that a close moisture control must be kept on the finished canned product with a moisture test being taken hourly. The moisture must remain at approximately 5% on the finished canned product. It has also been experienced that dried gravy products should be packaged or canned within 48 hours after drying in order to maintain the proper quality of the product. It is, however, possible to preserve the powdered product over 48 hours after drying if the powder is kept in tight polyethylene bags in a cool room.

Several methods of canning and packaging the dried gravy products have been accomplished. The dried gravy products may be vacuum filled into a #401 x 411 can and then vacuum closed at 26.5" of vacuum. It has also been found that the product may be canned with nitrogen flush which constitutes gas packing with nitrogen gas or in some cases $CO_2$, as is well known in the art. Plastic bag containers have also been used and gas packed with either nitrogen or $CO_2$. In all forms of packaging the dry powder form of gravy, it is important to have less than 2% residual oxygen in the finished package for extended shelf life and to insure rancidity prevention.

If it is desired to prepare the gravy product as a packaged frozen food item, the #2 slurry batch is prepared according to the #2 slurry formulae set out above with the elimination of the additional 1,483 lbs. of water in the case of both chicken and turkey. The dry ingredients of the #2 slurry formulae are merely added to the #1 slurry batch and mixed thoroughly as described. After mixing, the material is poured into suitable molds and frozen by lowering to a temperature of approximately 30° F. It has been found that 5½ oz. cube molds produce the desirable size for convenient family consumption. After the material is frozen, the cubes may be removed and suitably packaged in any desired manner.

To prepare a canned gravy the #2 slurry batch, in the case of both chicken and turkey, is thoroughly blended as described and heated to the boiling point. During the heating, sufficient water is added to the #2 slurry to bring the consistency of the slurry to that of the desired finished gravy. It is important that the desired gravy consistency be obtained at the boiling point since the flour and starch will otherwise tend to settle out in the can.

After the ingredients have been brought to a boil and the water content adjusted the hot gravy is filled into cans by conventional methods and sealed at approximately 170° F. under 8 to 10 inches of vacuum pressure. The canned gravy is then retorted or sterilized to insure preservation. In actual tests, it has been determined that 211 x 300 can size should be retorted for 70 minutes at 240° F. and that 300 x 407 can size should be retorted for 70 minutes at 250° F. for proper sterilization. The time stated is actual cooking time and does not include come-up and let-down time. The cans of sterilized gravy may then be water cooled for approximately 15 minutes and are then ready for further handling.

With gravy concentrate prepared according to the described formulae and process steps, and utilizing chicken or turkey meat, skin and fat the percentage analysis by dry weight of solids composition appears according to the following tables:

CONCENTRATED CHICKEN GRAVY COMPOSITION

| | Percent wt. of dry solids |
|---|---|
| Cooked chicken skin (20–20% fat) | 50.87 |
| Cooked chicken meat | 2.00 |
| Rice flour | 32.39 |
| Salt | 5.78 |
| Monosodium glutamate (Saligen) | 5.20 |
| Starch phosphate | 3.76 |
| U.S. certified egg yolk color (dark), antioxidant (Tenox #4) | Remaining |

CONCENTRATED TURKEY GRAVY COMPOSITION

| | Percent wt. of dry solids |
|---|---|
| Cooked turkey skin (25–30% fat) | 50.07 |
| Cooked turkey meat | 2.00 |
| Rice flour | 31.86 |
| Salt | 5.69 |
| Monosodium glutamate (Saligen) | 5.12 |
| Starch phosphate | 3.70 |
| Caramel color | 1.23 |
| Poultry seasoning (Lynden's Special by Crescent) | 0.43 |
| Antioxidant (Tenox #4) | Remaining |

Accordingly the food product may be characterized as containing about 50% dry weight of cooked poultry skin and natural fat, about 2% dry weight of cooked lean poultry meat fibers, said poultry skin, fat and lean meat fibers being capable of passing through an opening of 3/64 inch diameter, about 32% dry weight of rice flour, about 5% of dry weight of monosodium glutamate, about 3% dry weight of starch phosphate, and a rancidity preventing agent.

The present invention provides an extremely fine textured gravy product having exceptional flavor qualities obtained from actual meat substances with a low fat content compared to home prepared gravies and sauces, and prior art prepared gravy substances. The gravy of the present invention is also higher in food value than known prior art prepared gravies due to the actual meat content. The low calorie content of the gravy obtained from the present process also permits many persons to enjoy gravies and sauces which previously was impossible because of the high calorie content of such foods.

The essential food compensation of chicken and turkey gravies and sauces has been determined to be according to the following table:

ESSENTIAL TABLE OF FOOD COMPOSITION FOR CHICKEN AND TURKEY GRAVIES

| | | Chicken | Turkey |
|---|---|---|---|
| Potassium | percent | 1.81 | 1.73 |
| Iron | p.p.m. | 40 | 40 |
| Protein | percent | 17.68 | 16.71 |
| Crude Fiber | do | .50 | .53 |
| Ash | do | 6.55 | 7.25 |
| Sodium | do | 4.50 | 4.40 |
| Phosphorous | do | .05 | .05 |
| Calcium | do | .09 | .08 |
| Fat | do | 19.5 | 21.7 |
| Moisture | do | 3.7 | 4.5 |
| Carbohydrates | do | 52.07 | 49.31 |
| Calories—approx. 1 oz. serving of reconstituted gravy | | 15 | 15 |

P.p.m.—Parts per million.

From the foregoing, it will be apparent to those skilled in the art that the present invention provides novel and useful improvements in poultry gravies and processes of making the same. Certain modifications may be made in the process steps and composition well within the purview of this invention and applicant intends only to be limited to a liberal interpretation of the specification and appended claims.

Having thus described the invention, what is claimed as new and desired to be secured by Letters Patent is:

1. A process for making meat gravies and sauces the steps of which include; preparing a cooked meat substance comprising predominately natural fats and skin and small amounts of lean meat fibers, grinding and emulsifying the cooked meat substance into a finely divided form capable of passing through an opening of approximately 3/64 inch diameter, forming a first slurry by adding approximately equal parts of cold water to said meat substance, homogenizing said first slurry under pressure in the range of 3,000–8,000 p.s.i., forming a second slurry by bringing said first slurry to the range of 18–35% solids with the addition of cold water and dry additives, said additives including; about 32% dry weight of thickening agent, about 5% dry weight of monosodium glutamate, about 3% dry weight of starch phosphate and a rancidity preventing agent, and thoroughly mixing the second slurry to a smooth even consistency, the content of lean meat fiber in the final slurry being a maximum of 2% by weight of dry solids.

2. The process according to claim 1 wherein said first slurry is homogenized at a pressure of at least 5,000 p.s.i. and wherein said second slurry is preheated to approximately 125° F. and then spray dried to a moisture content of approximately 5% at a temperature of 295° F. to 300° F.

3. The process according to claim 1 including, bringing said second slurry to the boiling point and adjusting the water content of the slurry during heating to bring the consistency to that of the desired finished gravy, vacuum canning and sealing the slurry at approximately 170° F. under 8 to 10 inches of vacuum, and sterilizing said canned slurry.

4. A process for making meat gravies and sauces the steps of which include; preparing a cooked meat substance comprising predominately natural fats and skin with small amounts of lean meat fibers, reducing said substance to a finely divided emulsion, adding approximately equal parts of cold water to said substance to form a first slurry, homogenizing said first slurry under pressure in the range of 3,000–8,000 p.s.i., forming a second slurry by bringing said first slurry to the range of 18–35% solids with the addition and mixing of water and dry additives, said additives including; about 32% dry weight of thickening agent, about 3% dry weight of starch phosphate, about 5% dry weight of monosodium glutamate and a rancidity preventing agent.

5. The process according to claim 4 wherein said first slurry is homogenized at a pressure of at least 5,000 p.s.i., and wherein said second slurry is preheated to approximately 125° F. and then spray dried to a moisture content of approximately 5% at a temperature of 295° F. to 300° F.

6. The process according to claim 4 including, bringing said second slurry to the boiling point and adjusting the water content of the slurry during heating to bring the consistency to that of the desired finished gravy, vacuum canning and sealing the slurry at approximately 170° F. under 8 to 10 inches of vacuum, and sterilizing said canned slurry.

7. A process for making gravies comprising; finely dividing and emulsifying a cooked meat substance composed of predominate amounts of natural fat and skin with small amounts of lean meat fibers, adding approximately equal parts of cold water to form a slurry, homogenizing said slurry under pressure in the range of 5,000 p.s.i. to 8,000 p.s.i., and bringing said slurry to the range of 18–35% solids with the addition of water, about 32% dry weight of thickening agent, about 3% dry weight starch phosphate and a rancidity preventing agent.

8. A process for making gravies comprising; homogenizing under pressure in the range of 3,000 p.s.i. to 8,000 p.s.i. a finely divided and emulsified cooked meat substance composed of predominate amounts of natural fat and skin with equal parts of cold water, and then bringing said substance to the range of 18–35% solids with the addition of water, about 32% dry weight of thickening agent, about 3% dry weight of starch phosphate and a rancidity preventing agent.

9. The process according to claim 8 wherein said homogenization is accomplished under pressure of at least 5,000 p.s.i. and including, preheating said substance to approximately 125° F. and not in excess of 130° F., and spray drying said substance to a dehydrated powder form with a moisture content of approximately 5%.

10. The process according to claim 8 including the steps of bringing said substance to the boiling point and adjusting the water content of the slurry during heating to bring the consistency to that of the desired finished gravy, vacuum canning and sealing said substance at approximately 170° F. under vacuum, and sterilizing said canned substance.

11. The process according to claim 8 including the step of freezing said substance.

References Cited by the Examiner

UNITED STATES PATENTS

| | | | |
|---|---|---|---|
| 2,013,859 | 9/1935 | MacLachlan | 99—208 |
| 2,457,063 | 12/1948 | Morgan et al. | 99—208 |
| 2,622,028 | 12/1952 | Torr | 99—187 X |
| 2,865,763 | 12/1958 | Ferrara | 99—139 X |
| 2,870,028 | 1/1959 | Anderson et al. | |
| 2,968,569 | 1/1961 | Scharf | 99—208 |
| 3,113,030 | 12/1963 | Brody | 99—187 X |

A. LOUIS MONACELL, *Primary Examiner.*

HYMAN LORD, *Examiner.*